United States Patent
Dutto et al.

(10) Patent No.: US 9,683,504 B2
(45) Date of Patent: Jun. 20, 2017

(54) INTERNAL COMBUSTION ENGINE EQUIPPED WITH AN AFTERTREATMENT DEVICE

(71) Applicant: GM GLOBAL TECHNOLOGY OPERATIONS LLC, Detroit, MI (US)

(72) Inventors: Andrea Dutto, Turin (IT); Giorgio Nati, Villar Focchiardo (IT); Andrea De Filippo, Piemonte (IT); Cristian Taibi, Turin (IT); Adele De Domenico, Turin (IT)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 15/056,333

(22) Filed: Feb. 29, 2016

(65) Prior Publication Data

US 2016/0252028 A1 Sep. 1, 2016

(30) Foreign Application Priority Data

Feb. 28, 2015 (DE) ............... 20 2015 001 630 U

(51) Int. Cl.
*F01N 3/00* (2006.01)
*F02D 41/02* (2006.01)
(Continued)

(52) U.S. Cl.
CPC ............ *F02D 41/025* (2013.01); *F01N 3/08* (2013.01); *F01N 9/00* (2013.01); *F02D 41/0007* (2013.01);
(Continued)

(58) Field of Classification Search
CPC .......... F01N 9/002; F01N 3/023; F01N 3/035; F02M 26/13; F02D 41/024;
(Continued)

(56) References Cited

FOREIGN PATENT DOCUMENTS

DE 10033159 A1 1/2002
DE 100 66 237 * 6/2011

OTHER PUBLICATIONS

Machine Translation DE 100 66 237 done Jul. 24, 2016.*
German Patent Office, German Search Report for German Application No. 202015001630.8, dated Aug. 12, 2015.

* cited by examiner

*Primary Examiner* — Nicholas J Weiss
*Assistant Examiner* — Dapinder Singh
(74) *Attorney, Agent, or Firm* — Lorenz & Kopf LLP

(57) ABSTRACT

An internal combustion engine includes an aftertreatment device, an injector for injecting fuel into a cylinder and an Electronic Control Unit configured to perform a regeneration process of the aftertreatment device. The regeneration process includes determining a nominal fuel quantity to be injected by an after-injection; monitoring a temperature value of the aftertreatment device; determining a fuel quantity correction value, as a function of a difference between the monitored temperature value and a target temperature value of the aftertreatment device; correcting the nominal fuel quantity value, using the fuel quantity correction value, in order to determine a corrected fuel quantity value; performing a fuel injection cycle including a plurality of after-injections; and injecting the corrected fuel quantity value into the cylinder during one of the after-injections of the cycle.

17 Claims, 4 Drawing Sheets

(51) Int. Cl.
  *F01N 3/08*   (2006.01)
  *F01N 9/00*   (2006.01)
  *F02D 41/14*  (2006.01)
  *F02D 41/30*  (2006.01)
  *F02D 41/00*  (2006.01)
  *F02D 41/40*  (2006.01)

(52) U.S. Cl.
  CPC ............ *F02D 41/027* (2013.01); *F02D 41/14* (2013.01); *F02D 41/1446* (2013.01); *F02D 41/3005* (2013.01); *F02D 41/405* (2013.01); *F01N 2900/1602* (2013.01); *F02D 41/029* (2013.01); *F02D 41/0275* (2013.01); *F02D 41/402* (2013.01); *F02D 2041/1409* (2013.01); *F02D 2041/1422* (2013.01); *Y02T 10/47* (2013.01)

(58) Field of Classification Search
  CPC ............. F02D 41/1441; F02D 41/1446; F02D 41/405; Y02T 10/44; Y02T 10/47
  USPC ........................... 60/286, 295, 297, 299, 311
  See application file for complete search history.

INTERNAL COMBUSTION ENGINE EQUIPPED WITH AN AFTERTREATMENT DEVICE

CROSS-REFERENCE TO RELATED APPLICATION

This application claims priority to German Patent Application No. 202015001630.8, filed Feb. 28, 2015, which incorporated herein by reference in its entirety.

TECHNICAL FIELD

The present disclosure pertains to an internal combustion engine equipped with an aftertreatment device.

BACKGROUND

Internal combustion engines are conventionally equipped with an aftertreatment system that includes an exhaust pipe for leading the exhaust gas from the engine to the environment, and a plurality of aftertreatment devices located in the exhaust pipe, for reducing and/or removing pollutants from the exhaust gas before discharging it in the environment.

In greater detail, a conventional aftertreatment system generally includes several aftertreatment devices, such as a Diesel Oxidation Catalyst (DOC) for oxidizing hydrocarbon (HC) and carbon monoxides (CO) into carbon dioxide ($CO_2$) and water ($H_2O$), and a Diesel Particulate Filter (DPF), located in the exhaust pipe downstream the DOC, for removing diesel particulate matter or soot from the exhaust gas.

The Diesel Particulate Filter (DPF) collects liquid and solid particles in a porous substrate structure while allowing exhaust gases to flow through. As the DPF reaches its nominal storage capacity, it needs to be cleaned by a process called regeneration, during Which the exhaust gas temperature is increased substantially to create a condition whereby the soot contained in the DPF is burned (oxidized).

In order to reduce $NO_x$ emissions, aftertreatment systems may include a Lean NOx Trap (LNT) as an alternative to the DOC. A LNT is a device that is used to reduce oxides of nitrogen ($NO_x$) and includes a catalytic converter support coated with a special wash coat containing zeolites.

Lean $NO_x$ Traps (LNT) are also subjected to periodic regeneration processes or events, whereby such regeneration processes are generally provided to release and reduce the trapped nitrogen oxides ($NO_x$) from the LNT. Lean $NO_x$ Traps (LNT) are operated cyclically, for example by switching the engine from a lean bum operation to a rich operation, performing a regeneration event also referenced as a $DeNO_x$ regeneration.

Furthermore, internal combustion engines are currently operated with multi-injection patterns, namely for each engine cycle, a train of injection pulses is performed. A typical train of injections may start from a pilot injection pulse being followed by one or more pre-injections, by a main injection pulse, eventually terminating with one or more after and/or post injections. More specifically, fuel after-injections are fuel injections in a cylinder of the engine that occur after the Top Dead Center (TDC) of the piston.

Part of the fuel injected by means of after-injections bums inside the combustion chamber and part of it burns in an aftertreatment device, such as a DOC or as a LNT for performing the respective regenerations. After-injections therefore raise the temperature of the exhaust line and of the aftertreatment devices.

Moreover, the concept of multiple after injections in a single combustion cycle may improve the regeneration strategy of another type of aftertreatment device, namely the DPF, reducing oil dilution (due to post injections) and component stresses (due to soot cake and high thermal gradient across DOC) and allowing an effective regeneration also in the low load area (i.e. idle).

A train of multiple after injections increases the overall exhaust temperature, including the exhaust manifold of the turbine. This means that a DPF regeneration combustion operates much closer to the thermal limits of the turbine. The same effect may occur for other types of regeneration processes such as, for example, a LNT $DeNO_x$ regeneration.

Therefore the injected fuel quantity in a multi-after injection cycle is usually limited by the maximum exhaust manifold temperature that can be reached, even if such temperature is generally reached slowly.

SUMMARY

The present disclosure provides an improved control strategy capable to maintain the desired thermal conditions upstream of the aftertreatment device to be regenerated while, at the same time, complying with turbine temperature limits. The present disclosure further provides an improved control strategy capable to manage aftertreatment devices regenerations in an improved way, even in engine transient conditions. The above results are reached without using complex devices and by taking advantage from the computational capabilities of the Electronic Control Unit (ECU) of the vehicle.

An embodiment of the disclosure provides an internal combustion engine including an aftertreatment device, the internal combustion engine including an injector for injecting fuel into a cylinder and an Electronic Control Unit configured to perform a regeneration process of the aftertreatment device. During the process, a nominal fuel quantity to be injected by an after-injection is determined. A temperature value of the aftertreatment device is determined. A fuel quantity correction value is determined, as a function of a difference between the monitored temperature value and a target temperature value of the aftertreatment device. The nominal fuel quantity value is corrected using the fuel quantity correction value, in order to determine a corrected fuel quantity value. A fuel injection cycle including a plurality of after-injections is performed. The corrected fuel quantity value is injected into the cylinder by means of one of the after-injections of the cycle.

An effect of this embodiment is that it improves regeneration efficiency by rapidly increasing the temperature upstream of the aftertreatment device. Another effect that the above embodiment of the method achieves is to greatly decrease or eliminates soot cake in the aftertreatment device and lambda sensor clogging. An improved regeneration management also improves oil life, reduces oil dilution and other undesirable effects on regeneration efficiency and on components protection.

According to another embodiment of the present disclosure, determination of a fuel quantity correction value is performed only if the temperature value of the aftertreatment device is higher than a minimum aftertreatment device temperature value. An effect of this embodiment is that it avoids excessive fuel consumption.

According to another embodiment of the present disclosure, determination of a fuel quantity correction value is performed only if no faults of the injector or of an aftertreatment device temperature sensor are detected. An effect of this embodiment is that it avoids performing the regeneration process in all cases in which it would not work properly and, instead, to eventually signal the occurrence of a fault.

According to another embodiment of the present disclosure, determination of a fuel quantity correction value is performed only if an aftertreatment device regeneration combustion mode is active. An effect of this embodiment is that it starts the operations performed by the various embodiments of the method, and in particular, the correction of the after injection fuel quantity, only when it is needed for regenerating the aftertreatment devices.

According to still another embodiment of the present disclosure, the determination of the fuel quantity correction value is performed by multiplying the monitored temperature value by a coefficient, the coefficient being chosen on the basis of the type of aftertreatment device subjected to the regeneration process. An effect of this embodiment is that it simplifies the mathematical model used for the calculations needed for performing the method according to the various embodiments of the present disclosure. Furthermore, the calculation of the corrected after injection fuel quantity may be modulated for each regeneration process.

According to still another embodiment of the present disclosure, the ECU is configured to perform a low-pass filtering the fuel quantity correction value. An effect of this embodiment is that it avoids an excessive number of corrections, namely of applying the method of the various embodiments of the present disclosure only when necessary.

According to another embodiment of the present disclosure, the corrected fuel quantity is injected into the cylinder by the last after-injection of the cycle. An effect of this embodiment is that it implements the various embodiments of the present disclosure in the most efficient way.

According to another embodiment of the present disclosure, the fuel quantity correction value is added to the nominal fuel quantity value, if the difference between the monitored temperature value and the desired temperature value of the aftertreatment device is negative. An effect of this embodiment is that it increases, during engine transient operation, the temperature of the aftertreatment device to be regenerated.

According to another embodiment of the present disclosure, the fuel quantity correction value is subtracted to the nominal fuel quantity value, if the difference between the monitored temperature value and the desired temperature value of the aftertreatment device is positive. An effect of this embodiment is that it reduces the exhaust manifold temperature of the turbine when a higher temperature than desired is measured, in order to guarantee a better component protection.

Another aspect of the disclosure provides a method performing a regeneration process in an aftertreatment device of an internal combustion engine, the internal combustion engine including an injector for injecting fuel into a cylinder. The method includes determining a nominal fuel quantity to be injected by an after-injection, monitoring a temperature value of the aftertreatment device, determining a fuel quantity correction value, as a function of a difference between the monitored temperature value and a target temperature value of the aftertreatment device, correcting the nominal fuel quantity value, using the fuel quantity correction value, in order to determine a corrected fuel quantity value, performing a fuel injection cycle including a plurality of after-injections, and injecting the corrected fuel quantity value into the cylinder by means of one of the after-injections of the cycle.

An effect of this embodiment is that it improves regeneration efficiency by rapidly increasing the temperature upstream of the aftertreatment device. Another effect is that the above embodiment of the method greatly decreases or eliminates soot cake in the aftertreatment device and lambda sensor clogging. An improved regeneration management also improves oil life, and reduce oil dilution and other undesirable effects on regeneration efficiency and on components protection.

According to another embodiment of the present disclosure, determination of a fuel quantity correction value is performed only if the temperature value of the aftertreatment device is higher than a minimum aftertreatment device temperature value. An effect of this embodiment is that it avoids excessive fuel consumption.

According to a further embodiment of the present disclosure, determination of a fuel quantity correction value as a function of the monitored temperature value of the aftertreatment device is performed only if no faults of the injector or of an aftertreatment device temperature sensor are detected. An effect of this embodiment is that it avoids performing the regeneration process in all cases in which it would not work properly and, instead, to eventually signal the occurrence of a fault.

According to another embodiment of the present disclosure, determination of a fuel quantity correction value as a function of the monitored temperature value of the aftertreatment device is performed only if an aftertreatment device regeneration combustion mode is active. An effect of this embodiment is that it starts the operations performed by the various embodiments of the method, and in particular, the correction of the after injection fuel quantity, only when it is needed for regenerating the aftertreatment devices.

According to still another embodiment of the present disclosure, the determination of the fuel quantity correction value is performed by multiplying the monitored temperature value by a coefficient of proportionality, the coefficient of proportionality being chosen as a function of the type of aftertreatment device subjected to the regeneration process. An effect of this embodiment is that it simplifies the mathematical model used for the calculations needed for performing the method according to the various embodiments of the present disclosure and it modulates the calculation of the corrected after injection fuel quantity for each regeneration process.

According to another embodiment of the present disclosure, the method further includes a low-pass filtering the fuel quantity correction value. An effect of this embodiment is that it avoids an excessive number of corrections, namely of applying the method of the various embodiments of the present disclosure only when necessary.

According to another embodiment of the present disclosure, the corrected fuel quantity value is injected into the cylinder in the last after-injection of the cycle. An effect of this embodiment is that it implements the various embodiments of the present disclosure in the most efficient way.

According to another embodiment of the present disclosure, the fuel quantity correction value is added to the nominal fuel quantity value, if the difference between the monitored temperature value and the desired temperature value of the aftertreatment device is negative. An effect of this embodiment is that it increases, during engine transient operation, the temperature of the aftertreatment device to be regenerated.

According to another embodiment of the present disclosure, the fuel quantity correction value is subtracted to the nominal fuel quantity value, if the difference between the monitored temperature value and the desired temperature value of the aftertreatment device is positive. An effect of this embodiment is that it reduces the exhaust manifold temperature of the turbine when a higher temperature than desired is measured, in order to guarantee a better component protection.

A further aspect of the disclosure provides an apparatus for performing a regeneration process in an aftertreatment device of an internal combustion engine. The internal combustion engine includes an injector for injecting fuel into a cylinder. The apparatus further includes a computer program including a program-code for carrying out the method described above, and in the form of computer program product including the computer program. The computer program product can be embodied as a control apparatus for an internal combustion engine, including an Electronic Control Unit (ECU), a data carrier associated to the ECU, and the computer program stored in a data carrier. In this case, the control apparatus, when executing the computer program is configured to perform a fuel injection cycle including a plurality of fuel after-injections, evaluate a nominal fuel quantity to be injected in an after-injection of the cycle, monitor a temperature value of the aftertreatment device, determine a fuel quantity correction value, as a function of a difference between the monitored temperature value and a desired temperature value of the aftertreatment device, correct the nominal fuel quantity value, using the fuel quantity correction value, in order to determine a corrected fuel value, and inject the corrected fuel quantity value into the cylinder.

An effect of this aspect is that it improves regeneration efficiency by rapidly increasing the temperature upstream of the aftertreatment device. Another effect is that the above aspect of the present disclosure greatly decreases or eliminates soot cake in the aftertreatment device and lambda sensor clogging. An improved regeneration management also improves oil life, and reduce oil dilution and other undesirable effects on regeneration efficiency and on components protection.

According to another aspect of the present disclosure, the apparatus is configured to determine a fuel quantity correction value operate only if the temperature value of the aftertreatment device is higher than a minimum aftertreatment device temperature value. An effect of this aspect is that it avoids an excessive fuel consumption.

According to a further aspect of the present disclosure, the apparatus is configured determine a fuel quantity correction value as a function of the monitored temperature value of the aftertreatment device, operate only if no faults of the injector or of an aftertreatment device temperature sensor are detected. An effect of this aspect is that it avoids performing the regeneration process in all cases in which it would not work properly and, instead, to eventually signal the occurrence of a fault.

According to another aspect of the present disclosure, the apparatus is configured to determine a fuel quantity correction value as a function of the monitored temperature value of the aftertreatment device, operate only if an aftertreatment device regeneration combustion mode is active. An effect of this aspect is that it starts the operations performed by the various aspects of the method, and in particular, the correction of the after injection fuel quantity, only when it is needed for regenerating the aftertreatment devices.

According to still another aspect of the present disclosure, the apparatus is configured to determine the fuel quantity correction value operate by multiplying the monitored temperature value by a coefficient of proportionality, the coefficient of proportionality being chosen as a function of the type of aftertreatment device subjected to the regeneration process. An effect of this aspect is that it simplifies the mathematical model used for the calculations needed for perforating the method according to the various aspects of the present disclosure and it modulates the calculation of the corrected after injection fuel quantity for each regeneration process.

According to another aspect of the present disclosure, the apparatus includes a low-pass filter for the fuel quantity correction value. An effect of this aspect is that it avoids an excessive number of corrections, namely of applying the method of the various aspects of the present disclosure only when necessary.

According to another aspect of the present disclosure, the apparatus is configured to inject into the cylinder the corrected fuel quantity in the last after-injection of the cycle. An effect of this aspect is that it implements the various aspects of the present disclosure in the most efficient way.

According to another aspect of the present disclosure, the apparatus is configured to add the fuel quantity correction value to the nominal fuel quantity value, if the difference between the monitored temperature value and the desired temperature value of the aftertreatment device is negative. An effect of this aspect is that it increases, during engine transient operation, the temperature of the aftertreatment device to be regenerated.

According to another aspect of the present disclosure, the apparatus is configured to subtract the fuel quantity correction value to the nominal fuel quantity value, if the difference between the monitored temperature value and the desired temperature value of the aftertreatment device is positive. An effect of this aspect is that it reduces the exhaust manifold temperature of the turbine when a higher temperature than desired is measured, in order to guarantee a better component protection.

A still further aspects of the disclosure provides an internal combustion engine specially arranged for carrying out the apparatus and method further disclosed and claimed herein.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. Exemplary embodiments will now be described with reference to the enclosed drawings without intent to limit application and uses.

Figure 1:
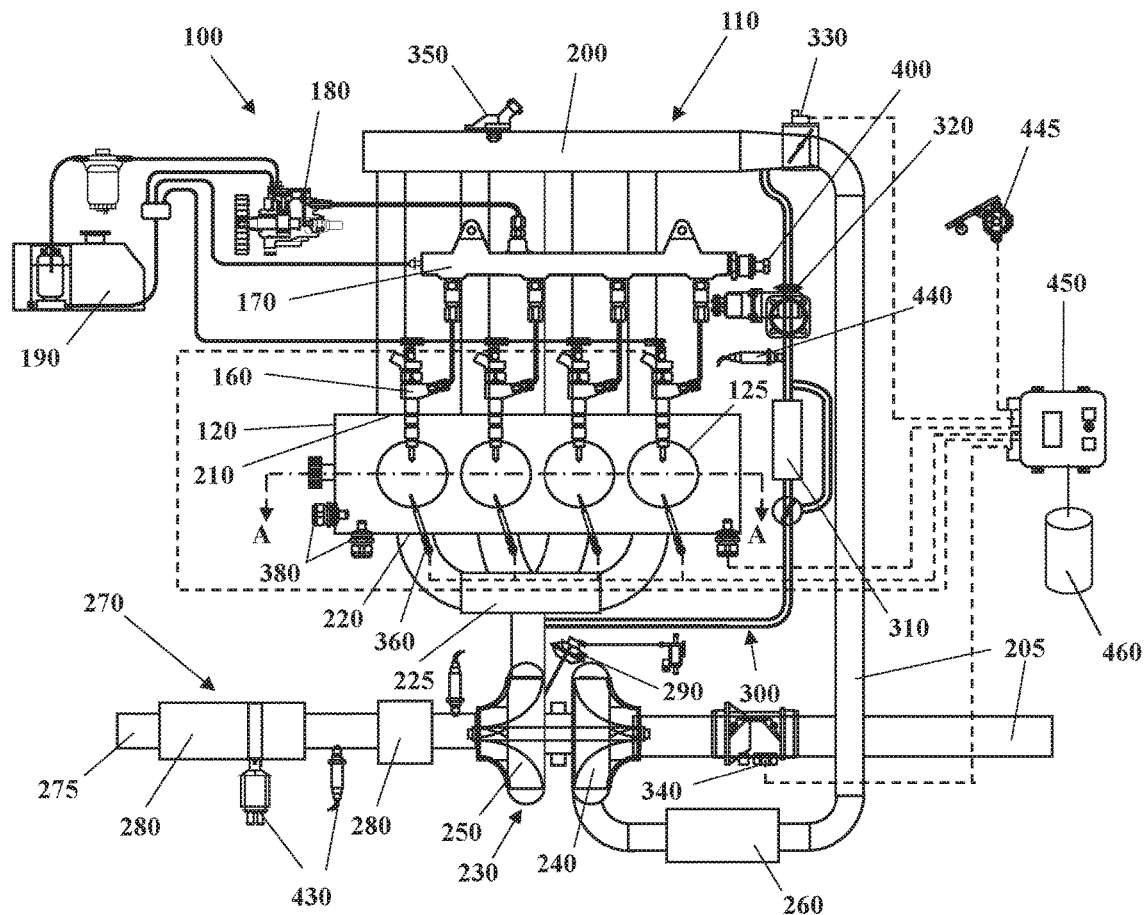
FIG. 1 shows an automotive system.
Figure 2:
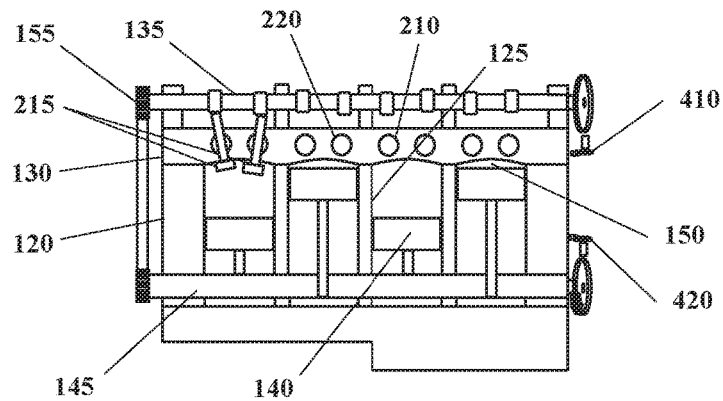
FIG. 2 is a cross-section of an internal combustion engine belonging to the automotive system of FIG. 1.

Some embodiments may include an automotive system 100, as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received from a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of varies prior to expansion through the turbine 250. The exhaust gases exit the turbine 250 and are directed into an exhaust system 270. This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate.

The exhaust system 270 may include an exhaust pipe 275 having one or more exhaust aftertreatment devices 280. The aftertreatment devices may be any device configured to change the composition of the exhaust gases. Some examples of aftertreatment devices 280 include, but are not limited to, catalytic converters (two and three way), oxidation catalysts, lean $NO_x$ traps, hydrocarbon adsorbers, selective catalytic reduction (SCR) systems, and particulate filters. Other embodiments may include an exhaust gas recirculation (EGR) system 300 '8 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an EGR temperature sensor 440, and an accelerator pedal position sensor 445. Further sensors may be present in the automotive system 100, as better detailed herein below. Furthermore, the ECU 450 may generate output signals to various control devices that are arranged to control the operation of the ICE 110, including, but not limited to, the fuel injectors 160, the throttle body 330, the EGR Valve 320, the VGT actuator 290, and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system, or data carrier 460, and an interface bus. The CPU is configured to execute instructions stored as a program in the memory system, and send and receive signals to/from the interface bus. The memory system may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carry out the steps of such methods and control the ICE 110.

The program stored in the memory system is transmitted from outside via a cable or in a wireless fashion. Outside the automotive system 100 it is normally visible as a computer program product, which is also called computer readable medium or machine readable medium in the art, and which should be understood to be a computer program code residing on a carrier, said carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing said computer program code is impressed on the transitory electromagnetic signal. Such signals are e.g. made use of when transmitting computer program code in a wireless fashion via a Wi-Fi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in the vehicle.

Figure 3:
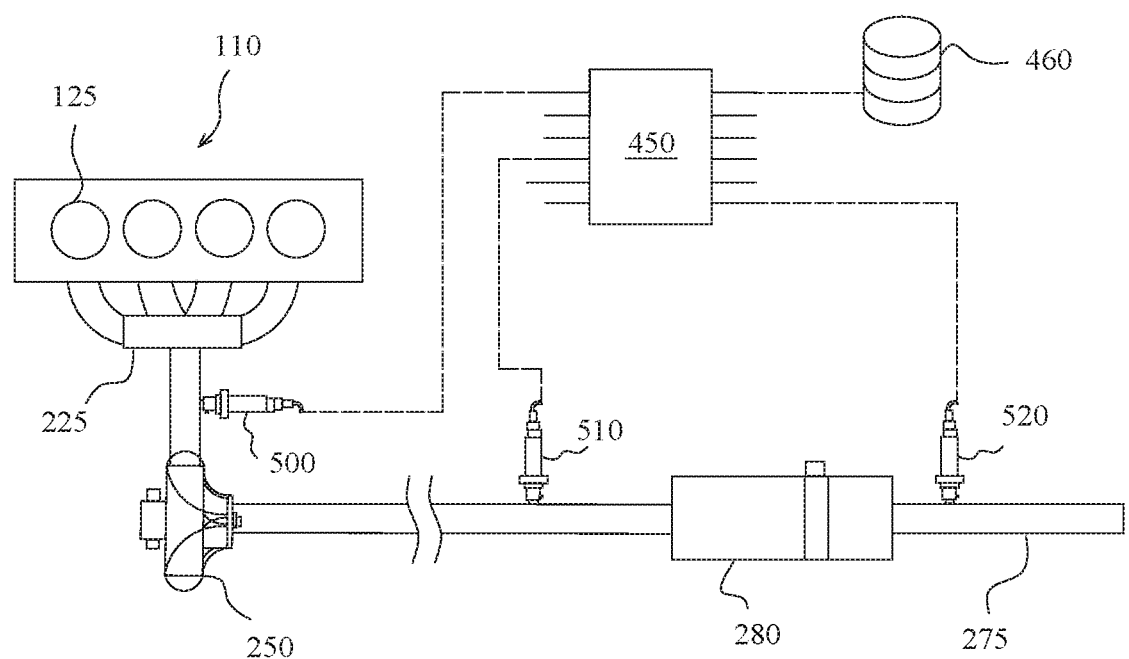
FIG. 3 is a schematic view of a portion of an aftertreatment system for an internal combustion engine.

With reference now to FIG. 3, a schematic view of a portion of an aftertreatment system for the internal combustion engine 110 is illustrated. In the embodiment depicted in FIG. 3, for simplicity only one aftertreatment device 280 is represented in the various embodiments of the present disclosure, the aftertreatment device 280 may be, in turn, a DPF or a LNT or other catalytic aftertreatment devices. In the exhaust line 275, a turbine inlet temperature sensor 500 is present, as well as temperature sensors 510, 520 upstream and downstream of the aftertreatment device 280.

Figure 4:
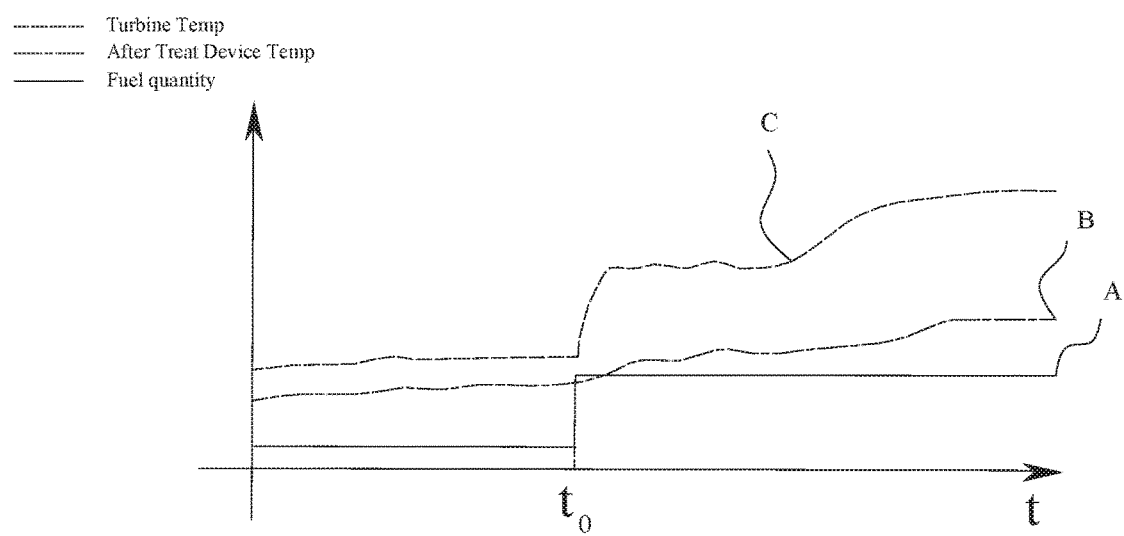
FIG. 4 is a graph representing several parameters as a function of time during the actuation of an embodiment of the present disclosure.

FIG. 4 is a graph representing several parameters as a function of time during the actuation of an embodiment of the present disclosure. In particular, curve A represents a fuel after-injection quantity injected in an after-injection pulse, in particular in the last after-injection pulse of a fuel injection cycle. After time $t_0$, the fuel after-injection quantity is increased. As a consequence, by continuously applying the increased after-injection quantity, both turbine temperature (curve C) an aftertreatment device temperature (curve B) are increased. For example, after 20-40 seconds, in the automotive system 100 the thermal limits of turbine temperature (790-810 degrees) is reached. For other automotive systems, different values may apply.

Figure 5:
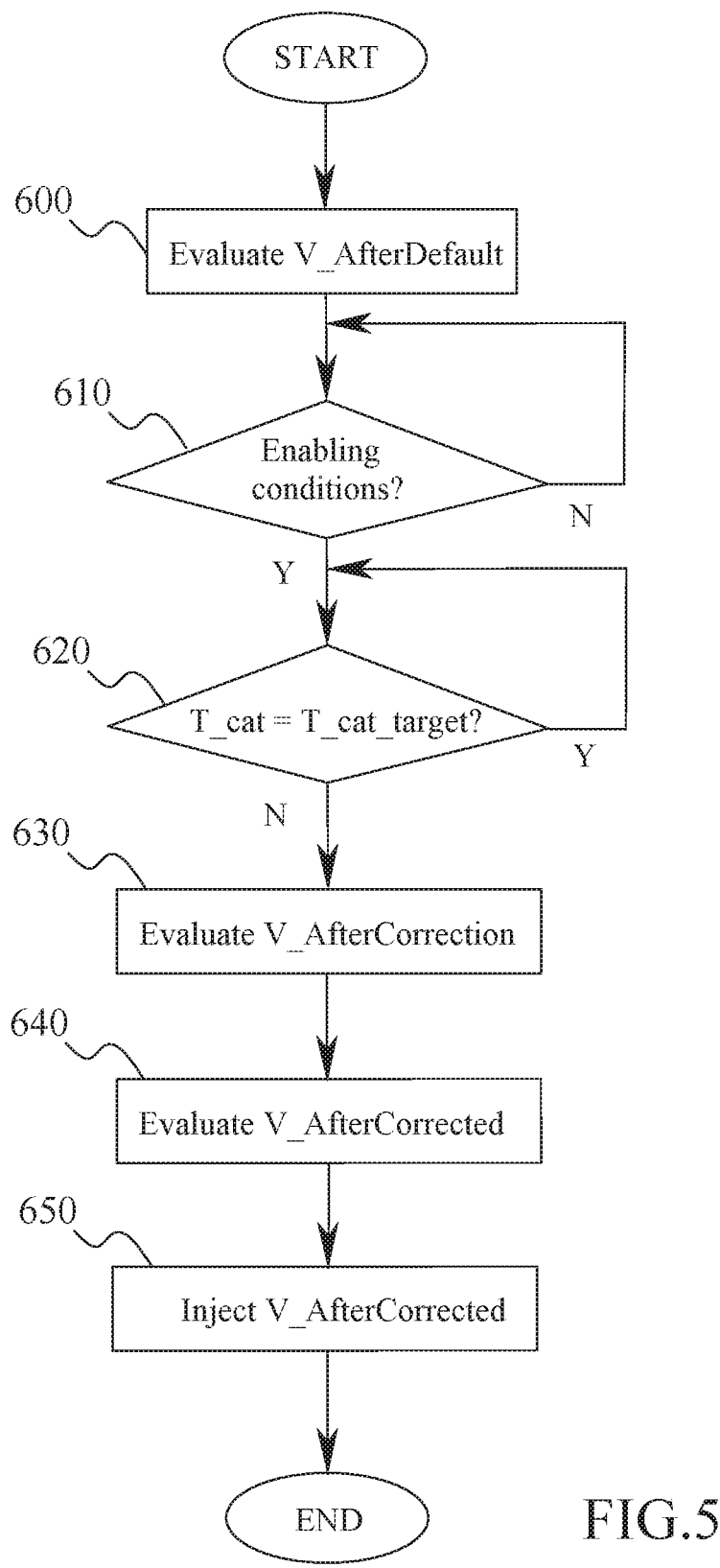
FIG. 5 is a flowchart describing an embodiment of the method of the present disclosure.

FIG. 5 is a flowchart describing an embodiment of the method of the present disclosure, which is performed in connection with multiple after injections in a single combustion cycle. A nominal fuel quantity V_AfterDefault to be injected in an after-injection of the cycle is evaluated at block 600. The nominal after injection quantity is calculated as a function of the engine operating point and, eventually, of other parameters by means, for example, of a map stored in data carrier 460 associated to the ECU 450.

Furthermore, a set of enabling conditions is monitored at block 610 in order to determine if it is possible to perform the subsequent steps of the various embodiments of the method. The specific enabling conditions will be described in more detail herein below.

A temperature value T_cat upstream of the aftertreatment device 280 is monitored, for example by employing aftertreatment device upstream temperature sensor 510, and if this temperature is different from a target temperature T_cat_target of the catalytic device, a fuel quantity correction value V_AfterCorrection is determined at block 630. Then the nominal fuel quantity V_AfterDefault is corrected using the fuel quantity correction value V_AfterCorrection, in order to determine a corrected fuel quantity value V_AfterCorrected at block 640. Finally, the corrected fuel quantity value V_AfterCorrected is injected into the cylinder 125 at block 650.

Determination of the fuel quantity correction value V_AfterCorrection as a function of the monitored temperature value T_cat of the catalytic device is performed only if the temperature value T_cat of the catalytic device is higher than a minimum catalytic device temperature value T_cat_min, in order to avoid excessive fuel consumption. Moreover, determination of a fuel quantity correction value V_AfterCorrection as a function of the monitored temperature value T_cat of the catalytic device is performed only if no faults are detected.

Also, determination of a fuel quantity correction value V_AfterCorrection as a function of the monitored temperature value T_cat of the catalytic device is performed only if an aftertreatment device regeneration combustion mode is active. In particular, the determination of the fuel quantity correction value V_AfterCorrection is performed by multiplying the monitored temperature value T_cat by a coefficient of proportionality k, the coefficient of proportionality k being chosen as a function of the type of aftertreatment device 280 subjected to the regeneration process.

For example a specific coefficient $k_{DPF}$ may be chosen, if a DPF regeneration must be performed, or a specific coefficient $k_{LNT}$ may be chosen, if a LNT regeneration must be performed and so on. These coefficients may be determined by an experimental activity and then stored in the data carrier 460 associated to the ECU 450. Furthermore, a low-pass filtering may be applied to the fuel quantity correction value V_AfterCorrection, in order to avoid an excessive number of corrections.

Preferably, the corrected fuel quantity value V_AfterCorrected is injected into the cylinder 125 in the last after-injection of the cycle. To perform in practice the after-injection fuel quantity correction, the fuel quantity correction value V_AfterCorrection is added to the nominal fuel quantity value V_AfterDefault, if the difference between the monitored temperature value T_cat and the desired temperature value T_cat_target of the aftertreatment device 280 is negative. In this case, this embodiment of the method improves regeneration efficiency by increasing the temperature upstream of the aftertreatment device and helps to avoid soot cake and lambda clogging.

In the alternative, the fuel quantity correction value V_AfterCorrection is subtracted to the nominal fuel quantity value V_AfterDefault, if the difference between the monitored temperature value T_cat and the desired temperature value T_cat_target of the aftertreatment device 280 is positive. In this case, this embodiment of the method improves component protection, such as the turbine by avoiding excessive temperatures at the inlet thereof.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An internal combustion engine comprising:
    an injector configured to inject fuel into a cylinder of the engine;
    an aftertreatment device in fluid communication with the cylinder and configured to remove pollutants from a fluid exhausted from the cylinder; and
    an electronic control unit configured to execute a regeneration process of the aftertreatment including:
    determine a nominal fuel quantity to injea with the injector during an after-injection;
    monitor a temperature value of the aftertreatment device;
    determine a fuel quantity correction value, as a function of a difference between the monitored temperature value and a target temperature value of the aftertreatment device, by multiplying the monitored temperature value by a coefficient, wherein the coefficient is based on a type of the aftertreatment device subjected to the regeneration process;
    correct the nominal fuel quantity value, using the fuel quantity correction value, in order to provide a corrected fuel quantity value;
    perform a fuel injection cycle including the after-injection; and
    inject the corrected fuel quantity value into the cylinder during the after-injection.

2. The engine according to claim 1, further comprising a temperature sensor associated with the aftertreatment device, wherein the electronic control unit is configured to determine a fuel quantity correction value when the temperature value of the aftertreatment device is higher than a minimum aftertreatment device temperature value.

3. The engine according to claim 2, wherein the electronic control unit is configured to check a fault state in at least one of the injector and the temperature sensor and determine a fuel quantity correction value when the fault stat indicates no faults in the injector or the temperature sensor.

4. The engine according to claim 1, wherein the electronic control unit is configured to determine a fuel quantity correction value when an aftertreatment device regeneration combustion mode is active.

5. The engine according to claim 1, further comprising a low-pass filter configured to filter the fuel quantity correction value.

6. The engine according to claim 1, wherein the electronic control unit is configured to inject the corrected fuel quantity value into the cylinder as a last after-injection of the fuel injection cycle.

7. The engine according to claim 1, wherein the electronic control unit is configured to add the fuel quantity correction value to the nominal fuel quantity value when the difference between the monitored temperature value and the desired temperature value of the aftertreatment device is negative.

8. The engine according to claim 1, wherein the electronic control unit is configured to subtract the fuel quantity correction value from the nominal fuel quantity value when the difference between the monitored temperature value and the desired temperature value of the aftertreatment device is positive.

9. A method for regenerating an aftertreatment device in the exhaust of an internal combustion engine having an injector configured to inject fuel into a cylinder of the engine, the method comprising:
  determining a nominal fuel quantity to inject with the injector during an after-injection;
  monitoring a temperature value of the aftertreatment device;
  determining a fuel quantity correction value, as a function of a difference between the monitored temperature value and a target temperature value of the aftertreatment device, by multiplying the monitored temperature value by a coefficient, wherein the coefficient is based on a type of the aftertreatment device subjected to the regeneration process;
  correcting the nominal fuel quantity value, using the fuel quantity correction value, in order to provide a corrected fuel quantity value;
  performing a fuel injection cycle including the after-injection; and
  injecting the corrected fuel quantity value into the cylinder during the after-injection.

10. The method according to claim 9, further comprising determining a fuel quantity correction value when a temperature value of the aftertreatment device is higher than a minimum aftertreatment device temperature value.

11. The method according to claim 10, further comprising:
  checking a fault state in at least one of the injector and a temperature sensor associated with the aftertreatment device; and
  determining a fuel quantity correction value when the fault state indicated no fault in the injector or the temperature sensor.

12. The method according to claim 9, further comprising determining the fuel quantity correction value when an aftertreatment device regeneration combustion mode is active.

13. The method according to claim 9, further comprising low-pass filtering the fuel quantity correction value.

14. The method according to claim 9, further comprising injecting the corrected fuel quantity value into the cylinder as a last after-injection of the fuel injection cycle.

15. The method according to claim 9, further comprising adding the fuel quantity correction value to the nominal fuel quantity value when the difference between the monitored temperature value and the desired temperature value of the aftertreatment device is negative.

16. The method according to claim 9, further comprising subtracting the fuel quantity correction value from the nominal fuel quantity value when the difference between the monitored temperature value and the desired temperature value of the aftertreatment device is positive.

17. An internal combustion engine comprising:
  an injector configured to inject fuel into a cylinder of the engine;
  an aftertreatment device in fluid communication with the cylinder and configured to remove pollutants from a fluid exhausted from the cylinder; and
  an electronic control unit configured to execute a regeneration process of the aftertreatment including:
  determine a nominal fuel quantity to inject with the injector during an after-injection;
  monitor a temperature value of the aftertreatment device;
  determine a fuel quantity correction value, as a function of a difference between the monitored temperature value and a target temperature value of the aftertreatment device;
  correct the nominal fuel quantity value, using the fuel quantity correction value, in order to provide a corrected fuel quantity value;
  perform a fuel injection cycle including a plurality of after-injections; and
  inject the corrected fuel quantity value into the cylinder during a last after-injection of the plurality of after-injections.

* * * * *